United States Patent [19]
Merrett

[11] Patent Number: 5,509,437
[45] Date of Patent: Apr. 23, 1996

[54] DRY HYDRANT CHECK VALVE

[75] Inventor: Stanley L. Merrett, Dadeville, Ala.

[73] Assignee: Schlumberger Industries, Inc., Norcross, Ga.

[21] Appl. No.: 180,406

[22] Filed: Jan. 12, 1994

[51] Int. Cl.⁶ .................................... E03B 9/02
[52] U.S. Cl. .................. 137/15; 137/236.1; 137/239; 137/512.15; 137/513.5; 169/51; 169/91
[58] Field of Search ............... 137/236.1, 512.15, 137/513.5, 583, 239, 590, 15; 169/5, 13, 24, 51, 91; 417/435

[56] References Cited

U.S. PATENT DOCUMENTS

| | | | |
|---|---|---|---|
| 106,433 | 8/1870 | Van Keuren | 137/512.15 |
| 857,519 | 6/1907 | Foster | 137/590 X |
| 901,733 | 10/1908 | O'Sullivan | 169/91 |
| 1,209,800 | 12/1916 | Barber | 137/236.1 |
| 2,776,169 | 1/1957 | Aschenbrenner | 137/236.1 X |
| 2,847,149 | 8/1958 | Ainsworth | 417/435 X |
| 3,108,440 | 10/1963 | Anderson | 137/236.1 X |
| 3,759,330 | 9/1973 | Rainey et al. | 169/13 X |
| 3,831,628 | 8/1974 | Kintner et al. | 137/512.15 |
| 4,319,452 | 3/1982 | Morita et al. | 137/512.15 X |
| 4,508,138 | 4/1985 | Dixon | 137/239 |
| 5,082,013 | 1/1992 | Scheib | 137/236.1 X |
| 5,203,682 | 4/1993 | Inklebarger | 417/435 |

FOREIGN PATENT DOCUMENTS

1773983  11/1992  U.S.S.R. .................. 137/236.1

*Primary Examiner*—John Rivell
*Attorney, Agent, or Firm*—Keith G. W. Smith

[57] ABSTRACT

A dry (unpressurized) hydrant utilizes a hydrant pipe wherein a submerged end carrying a strainer assembly is placed at a predetermined depth within a body of water, such as a lake or a pond, with the unsubmerged end being located above ground adjacent the water surface. A check valve installed behind the underwater strainer allows the pipe to be filled with water delivered from a tank onboard a pumper truck. Flooding the pipe in this manner allows the pumper truck to then pump water from the lake or pond, through the hydrant, with little or no priming necessary so as to meet fire suppression demands. A vent valve located on the pumper intake connected to the unsubmerged end allows air to escape from the pipe during the filling process. In a further embodiment, a bypass system enables the strainer to be periodically back-flushed, without removal of the strainer, through the provision of a bypass check valve which opens in the reverse direction from the main check valve at a pressure greater than the normal filling pressure.

15 Claims, 8 Drawing Sheets

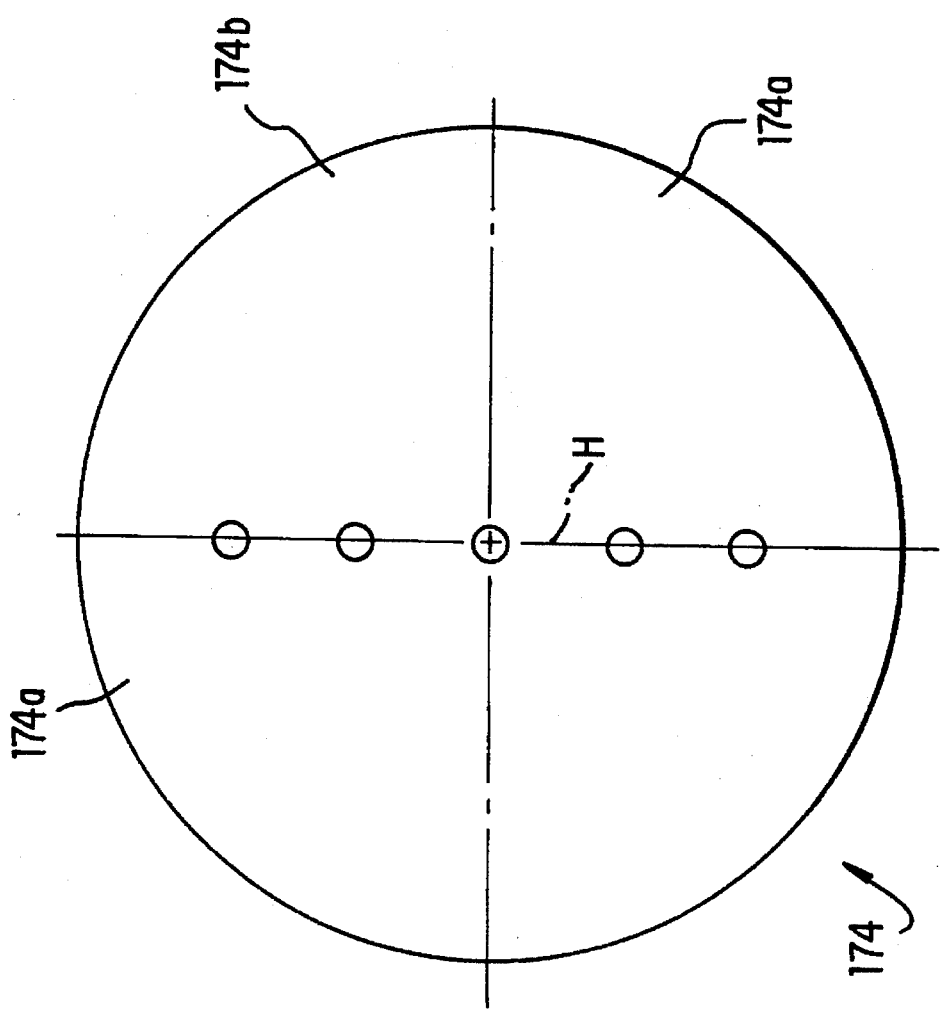

5,509,437

DRY HYDRANT CHECK VALVE

TECHNICAL FIELD

The present invention relates generally to fire hydrants and, more particularly, to a dry (unpressurized) hydrant which may be suitable for use with bodies of water having both variable and different types of water levels and bottom conditions affecting dry hydrant installation.

BACKGROUND ART

Dry hydrants are a type of fire service hydrant generally for use where there is no source of pressurized water. For example, in rural communities where there is no centralized water service, water for fire fighting is commonly drawn from lakes, ponds, cisterns or the like. Typically, a tanker truck will draw water from a nearby body of water using a flexible hose fitted with a special strainer to prevent debris from being drawn into the hose. The tanker will then travel to the site of the fire where a pumper truck draws water from the tanker to fight the fire.

Such an arrangement is inconvenient and may waste valuable time while the special strainer is being connected to the hose. The special strainer assembly must then be properly disposed within the body of water. If placed indiscriminately, the strainer may draw debris, leaves or mud which will clog the strainer and diminish the water flow to the tanker.

To avoid the foregoing problem, a so-called "dry hydrant" is permanently installed and, as best depicted in FIG. 1A, comprises a length of pipe 10 having one end 12 (i.e., the submerged end) disposed below the water line 14 of the body of water 16, with the other end 18 (the unsubmerged end) exposed at or near the shoreline 20. In this arrangement, a length of polyvinyl chloride (PVC) pipe 10 is laid in a trench dug from the shoreline 20 to enable the submerged end 12 to be disposed at a predetermined fixed depth in the water 16. The horizontal extent 10a of the pipe 10 is connected via a 90° elbow 22 to a vertical standpipe 10b. The standpipe 10b is provided with a coupling 24A which enables a standard fire service hose to be connected to the standpipe to draw water through the dry hydrant pipe 10 to a tanker truck. A capped strainer 24B is connected to the submerged pipe end 12 and is maintained a predetermined distance off the bottom 26 with a support 28 anchored to the bottom but at a depth sufficient to provide water during drought conditions which may occur only once every fifty years (i.e., the fifty year drought level 30).

Since the dry hydrant 10 is a suction device, the fire department pump must be primed before flow can be established. This is accomplished by using a small primer pump usually having an electric motor. Generally speaking, primer pumps should not be operated for longer than one minute since motor burnout is likely to occur which would prevent the larger centrifugal fire pump from flowing water at draft. With standard dry hydrants such as depicted in FIG. 1A, installations having excessive lengths of dry pipe 10a, 10b cannot be allowed if primer burnout is to be prevented.

FIG. 1B is an illustration of a conventional shallow pond installation wherein the pond has a gradual sloped bottom 32 which generally prevents a backhoe from reaching out far enough into the pond to provide a trench at proper depth. In this type of situation, only draining of the pond or use of a drag line would allow for proper installation. In most cases, however, this is either not possible or is cost prohibitive. This type of installation is often characterized by excessive pipe lengths 10c and 10d relative to the pipe lengths 10a, 10d used in the standard installation of FIG. 1A.

FIG. 1C is an illustration of a dry hydrant installation in situations where underground rock 34 prevents continued horizontal laying of pipe beneath the water surface. This installation also results in excessive dry pipe lengths 10e.

It is accordingly an object of the present invention to have a dry hydrant installation which may be flooded with water that will allow for easy priming of fire department pumping equipment without the occurrence of primer pump motor burnout.

Another object is to provide a dry hydrant installation which may have excessive dry pipe and be easily flooded to avoid primer burnout.

Still another object is to install a check valve within the pipe which will allow water to be held for at least a short time period in the pipe in order to flood it and allow the centrifugal fire pump to be primed and easily flow water at draft.

SUMMARY OF THE INVENTION

The present invention meets the foregoing objects with an above-ground dry hydrant comprising an unpressurized hydrant pipe having a submerged end located within a body of water and an unsubmerged end located elevationally above the body of water. In accordance with the invention, a valve is mounted to the pipe and is operable to (1) permit a flow of water therethrough from the water body in response to a demand pressure applied at the unsubmerged end, and (2) impede a reverse flow of water therethrough in a direction extending towards the water body. In this manner, the valve enables the pipe to be filled with water. This replaces the air within the pipe to facilitate priming and prevent primer burnout before normal flow can be established.

In a preferred embodiment, the valve is a check valve which is connected between an underwater strainer and the submerged end. The check valve includes a check valve assembly mounted in a valve housing respectively attached, at opposite ends thereof, to the underwater strainer and to the submerged end. Installation of this check valve behind the underwater strainer and adjacent the submerged end allows water pumped into the dry pipe, such as from a tank onboard a pumper truck, to be held within the pipe at least for a short time period sufficient so to enable a primer pump to establish proper flow so that a larger (e.g., centrifugal) fire pump can flow water from the pipe at draft.

Preferably, the check valve assembly is comprised of a valve support plate formed with plural openings which permit fluid flow therethrough from the water body in response to the demand pressure. A valve seal is mounted to the valve support plate on a side thereof facing the unsubmerged end. The valve seal is arranged to (1) at least substantially entirely cover the plural openings under the action of reverse flow of fluid entering the pipe from the unsubmerged end and (2) be deflected into an open position in response to the demand pressure so as to permit the aforesaid fluid flow of water through the openings.

The valve support plate may have a periphery shape to correspond to the shape of the valve housing inner surface to which it is connected. The valve seal is flexible and connected to the valve support plate so as to be bendable away from the plate in response to the fluid flow from the water body (to open the valve), and to be pressed flat against the plate in response to the reverse flow (to close the valve) to initially fill the pipe.

The valve seal and the valve plate are preferably circular in configuration and a hinge bar may be used to connect the valve seal to the plate. In the preferred embodiment, the hinge bar extends along the diameter of the valve seal to define a pair of valve seal flaps which open and close along the hinge line established by the hinge bar.

The valve support plate is preferably formed with a band of circumferentially spaced thin slots which are located radially outward from the periphery of the valve seal and therefore remain continuously open irrespective of valve seal position. This allows for controlled leakage of fill fluid from the pipe into the water body to allow the remaining water in the pipe to recede to the level of the water body, after completion of pumping, to prevent freezing.

In accordance with another unique feature of the present invention, a vent valve is mounted to the pipe adjacent the unsubmerged end thereof to vent the air within the pipe as it is displaced by the reverse flow when the pipe is being filled. Preferably, the vent valve is connected to a coupling adapter having one end attached to the unsubmerged end of the pipe and an opposite end to which a hose is attached to selectively pump the reverse flow of water into the pipe or to apply the demand pressure thereto. The vent valve defines the highest elevational point within a portion of a water circuit extending between the check valve and the point at which the demand pressure is applied to the pipe.

In accordance with still another feature of the invention, there is provided a bypass valve arrangement including a bypass passage having one end connected to the pipe upstream from the check valve and an opposite end located downstream from the check valve in communication with the strainer. A bypass check valve is mounted within the bypass passage and is operable to open, under a predetermined reverse flow pressure, to permit back-flushing of the strainer while the main check valve remains normally closed under this reverse flow pressure.

A method of using an above-ground dry hydrant having an unpressurized hydrant pipe with a submerged end located within a body of water and an unsubmerged end located elevationally above the body of water is also disclosed. The method of the invention comprises the steps of filling the pipe with fluid to displace air therewithin, and then applying a demand pressure to the pipe proximate the unsubmerged end thereof to begin drawing water through the pipe from the water body.

In accordance with the method of the invention, water required to fill the pipe is delivered from a tank onboard a pumper truck. The amount of water carried onboard will determine the length of pipe which can be flooded.

In another aspect of the method of the present invention, air is vented within the pipe during the fluid filling step.

In yet a further embodiment of the method of the present invention, a strainer attached to the submerged end of the pipe is periodically back-flushed to prevent clogging. Back-flushing occurs by directing a reverse flow of fluid down through the pipe from the unsubmerged end and through a bypass passage which opens a one-way bypass check valve in the passage with a predetermined back-flushing reverse flow pressure which is greater than the pressure normally used to fill the pipe.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 6 is a front plan view of a check valve seal of the check valve assembly;

FIG. 7 is a side profile view of the valve seal of FIG. 6;

BEST MODE FOR CARRYING OUT THE INVENTION

Figure 2:
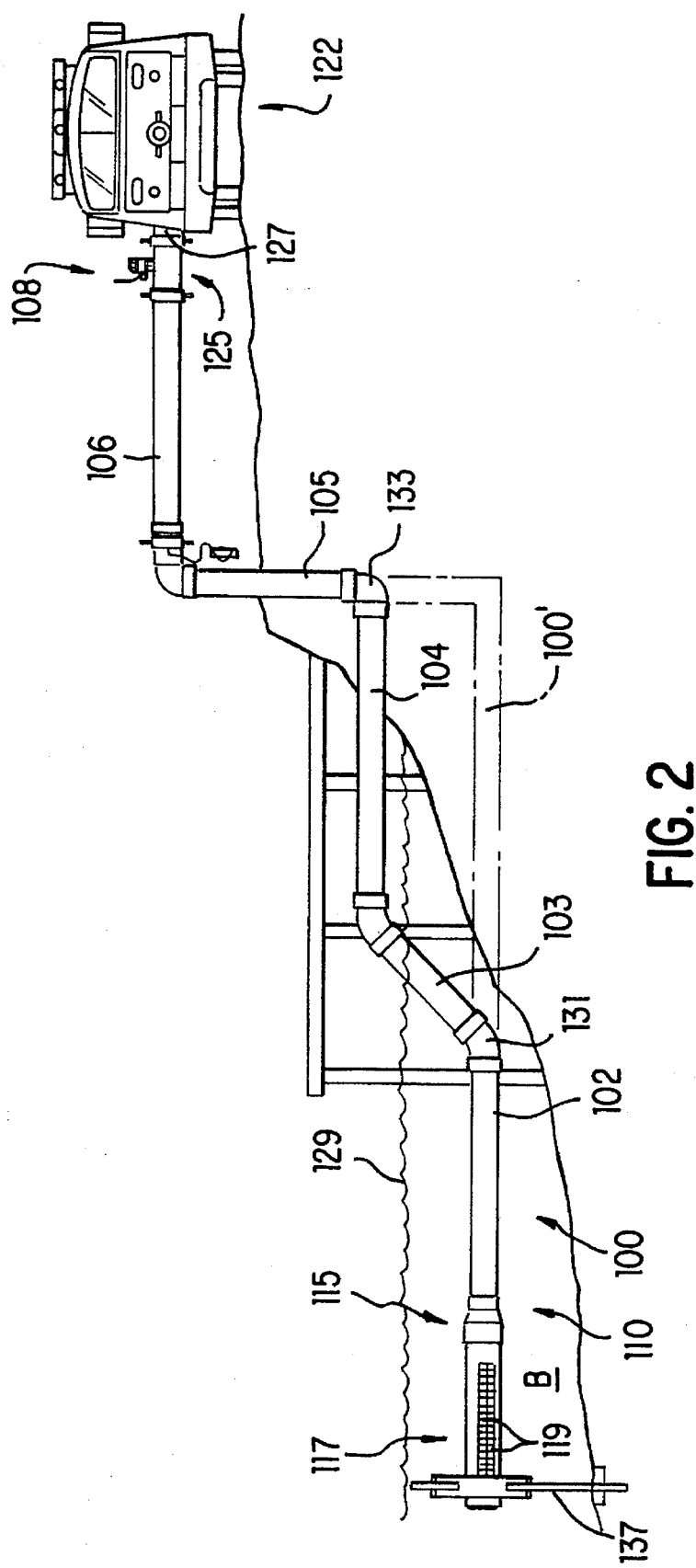
FIG. 2 is an elevational view, partially in schematic form, of a dry hydrant installation constructed in accordance with the present invention.
Figure 3:
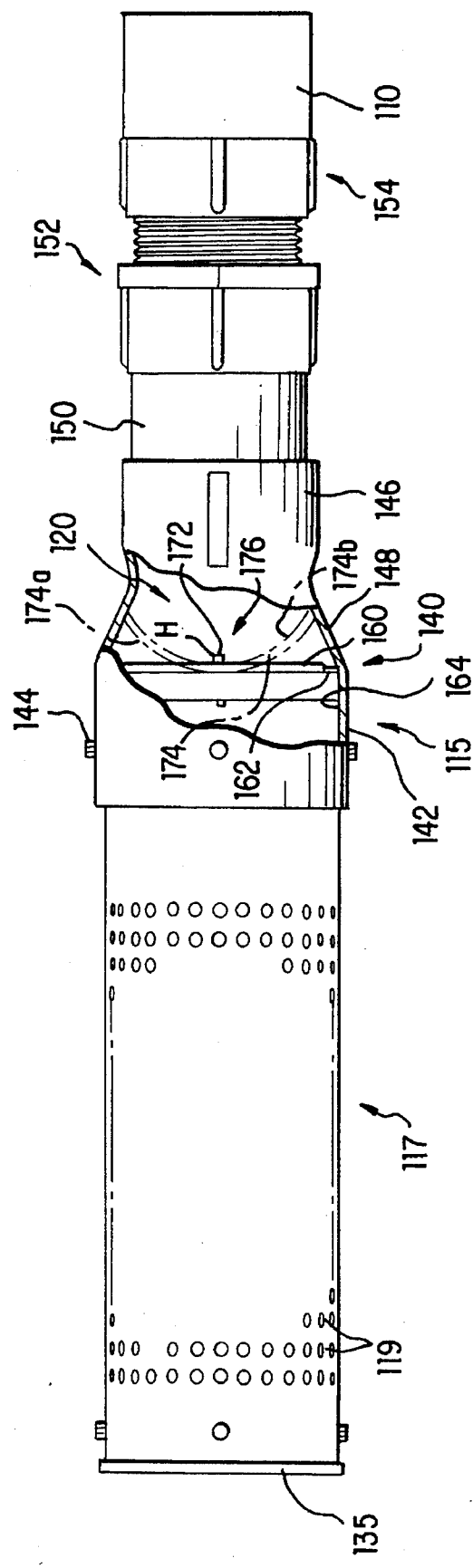
FIG. 3 is a sectional view of a check valve assembly in accordance with the present invention.

A dry hydrant installation 100, constructed in accordance with the principles of the present invention, is depicted in FIG. 2 and generally comprises a normally unpressurized hydrant pipe having one or more sections 102, 103, 104, 105 and 106, described more fully below, which define an unsubmerged end 108 located adjacent and above a body of water B and a submerged end 110 located within the body of water (preferably at a depth greater than the 50 year drought level). In accordance with the unique features described hereinbelow, a check valve 115 is connected to the submerged end 110 of the hydrant pipe 100 upstream and immediately adjacent a strainer 117 having a plurality of openings 119 formed along its length. As best depicted in FIG. 3, the check valve 115 includes a check valve assembly 120 which is operable to prevent reverse fluid flow from the hydrant pipe 100 into the body of water B through the strainer 117, to advantageously allow the pipe to be filled with water which may be supplied from a pump truck 122 (FIG. 2), connected to the unsubmerged end 108 such as through a unique vent valve and coupling adapter 125, depicted in FIG. 9, discussed infra. The normal closing action of the check valve 115 allows air within the pipe 100 to be replaced with water carried onboard the pumper truck 122 as air escapes from the pipe through the vent valve 125 during the filling process. When the pipe 100 is full, the vent valve 125 is then closed. Pumping can then usually be started without any priming. If priming is required, it will be for an extremely brief interval since the entire dry hydrant system 102–106 is now filled through the pump from the water carried onboard the fire truck 122.

Upon completion of fire suppression demands, the pump may be shut down and a suction hose 127 thereof removed from the dry hydrant vent coupling adapter 125. The check valve 115 is preferably designed to provide for a slow leakage through the valve which enables the remaining water in the dry hydrant 100 to recede to the surface level 129 of the water body B, thus preventing freezing of the hydrant pipe above the freeze zone.

The dry hydrant pipe 100 between the unsubmerged and submerged ends 108,110 thereof may be formed from polyvinyl chloride (PVC) pipe of sufficient diameter (e.g., six inches), wherein the plural pipe sections 102–106 are interconnected as necessary through a series of 45° and 90° elbow sections 131 and 133 to locate the strainer 117 at a proper depth beneath the surface 129 of the water body B. A hydrant pipe installation 100' in areas where freezing is a problem is depicted in phantom line in FIG. 2.

The strainer 117 functions as an intake assembly which may be connected to the submerged end 110 of the pipe 100 through the check valve 115 of the invention as described more fully below. The strainer 117 generally consists of a section of PVC pipe having the plural openings 119 formed along its length. Preferably, the length of the strainer 117 is in the range of four to eight times the diameter of the pipe forming the strainer. The open end of the strainer 117 may be covered with a cap 135 and supported a predetermined distance from the water bottom via an upright support 137 to prevent the intake of debris, fish or the like into the hydrant pipe 100 through the check valve 115. The strainer openings 119 are designed to be large enough to admit a free flow of water when the strainer 117 is disposed in the water body B and suction pressure is supplied to the hydrant pipe 100 via the fire hose service coupling 125 by fire service pumper or tanker 122.

As best depicted in FIG. 3, the check valve assembly 120 is disposed within a check valve housing 140 (preferably made of PVC) having a larger diameter downstream end 142 bolted to the upstream end of the strainer 117 with a plurality of circumferentially spaced bolts 144, and a smaller diameter upstream end 146 integral with the larger diameter downstream portion through a frusto-conical reducing section 148. The smaller diameter upstream end 146 of the check valve housing 140 may be attached to the submerged end 110 of the hydrant pipe 100 using a variety of different attachment methods, such as a plastic pipe 150 projecting from the upstream end 146 and carrying a male coupling 152 adapted to be received within a female coupling 154 fixed to the submerged end 110 of the hydrant pipe to facilitate rapid installation, repair or replacement of the overall check valve and strainer assembly.

Figure 5:
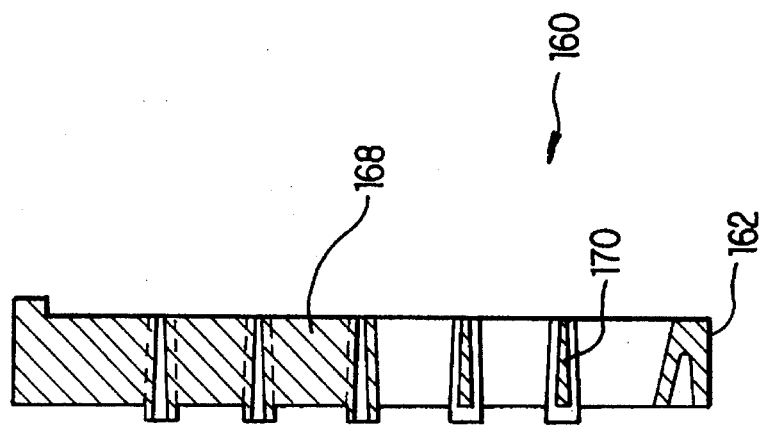
FIG. 5 is a sectional view taken along the line 5—5 of FIG. 4.
Figure 4:
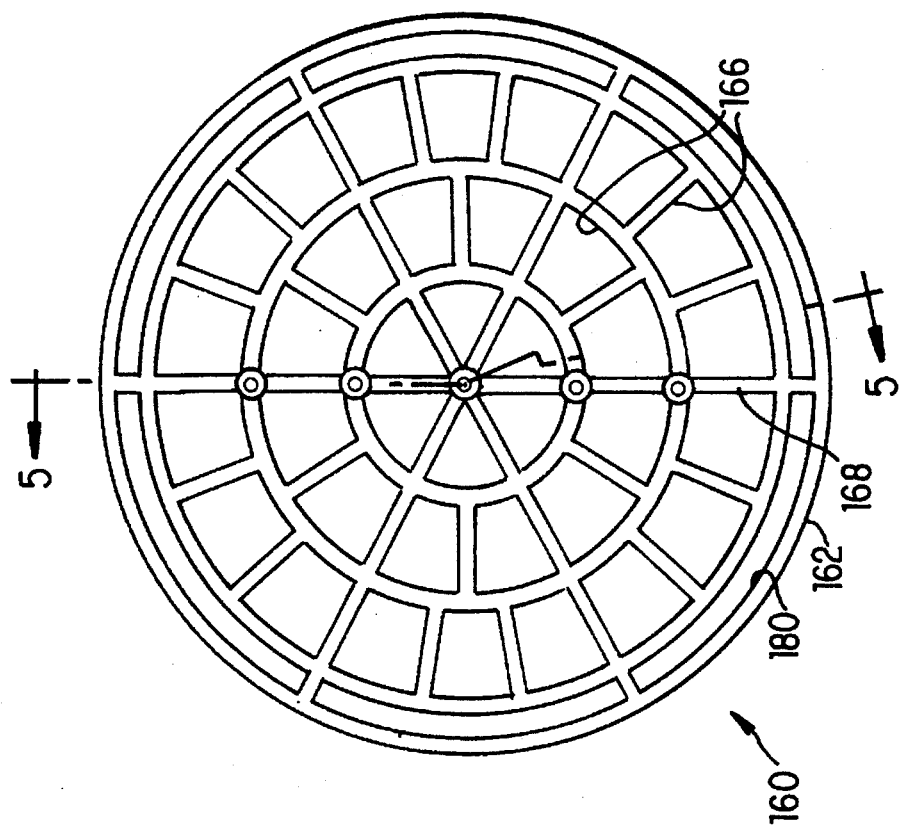
FIG. 4 is a front plan view of a check valve plate within the check valve assembly of FIG. 3.

Still with reference to FIG. 3 and in more detail in FIGS. 4–8, the check valve assembly 120 comprises a circular valve support plate 160 having a periphery 162 bonded or otherwise secured to the inner surface 164 of the larger diameter portion 142 of the check valve housing 140 so as to extend in a plane perpendicular to the flow axis. As best depicted in FIGS. 4 and 5, the check valve support plate 160 is formed with a plurality of openings 166 arranged in concentric arrays which are designed to be large enough to admit a free flow of water into the hydrant pipe 100 when the negative demand pressure is applied to the pipe.

The check valve support plate 160 is further characterized by a valve seat mounting rib 168 extending along a diameter of the support plate. The rib 168 is formed with a plurality of radially spaced bores 170 which respectively receive a series of screws 172 used to bolt a flexible valve seal member 174 with a hinge bar 176 (FIG. 8) to one side of the valve support plate 160 facing in the direction of the unsubmerged end 108 of the hydrant pipe 100.

As best depicted in FIGS. 6 and 7, the flexible check valve seal 174 is also of circular configuration in plan view and has a diameter adapted to cover the concentric arrays of openings 166 formed in the valve support plate 160 when the check valve is in the closed position which is caused by the pressure of fluid entering the hydrant pipe 100 from the fire service pumper or tanker 122 during initial filling. In this manner, this self-closing action of the flexible valve seal 174 against the valve support plate 160 serves to retain the water within the pipe 100 for fast and reliable filling. However, with reference again to FIG. 4, it can be seen that the valve plate 160 is further formed with a series of elongate circumferentially spaced openings 180 (each subtending an arcuate interval of approximately 60°) which are radially outwardly spaced from the periphery 174a of the flexible valve seal 174 when in the flat, closed position. These outer openings 180 in the valve support plate 160 function as weep holes which serve to automatically drain the hydrant pipe 100 upon completion of pumping water for fire suppression demands to advantageously prevent freezing of the hydrant pipe. It will be appreciated that these so-called weep openings 180 are designed to result in controlled leakage of the valve 120 without seriously affecting the ability of the valve to retain water within the pipe 100 for a sufficient time period to allow for rapid filling at the onset of fire suppression pumping demands.

Figures 8A, 8B:
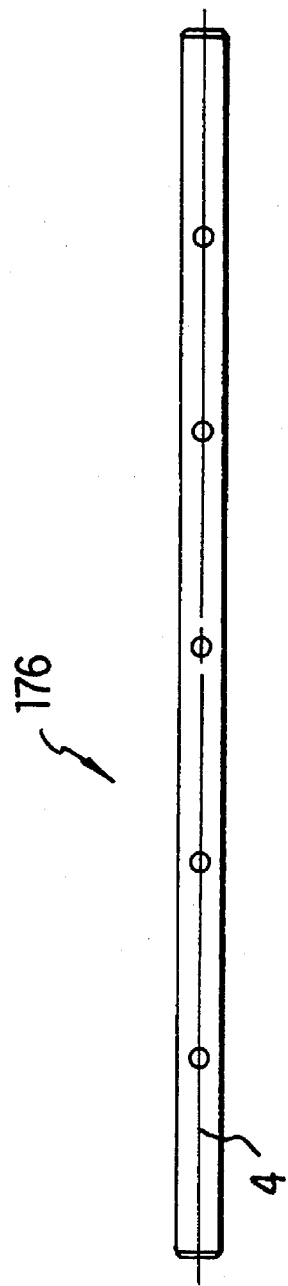
FIG. 8 is a front plan view of a retainer hinge bar used to bolt the valve seal to the valve support plate.

FIG. 8 is an illustration of the retainer hinge bar 176 which is formed of square stock and defines a hinge axis 4 that divides the valve seal 174 into a pair of symmetrical valve flaps 174a, 174b, each opening and closing about the hinge axis in response to positive filling pressures (closing the valve), or negative demand pressures (automatically opening the valve).

Figure 1A:
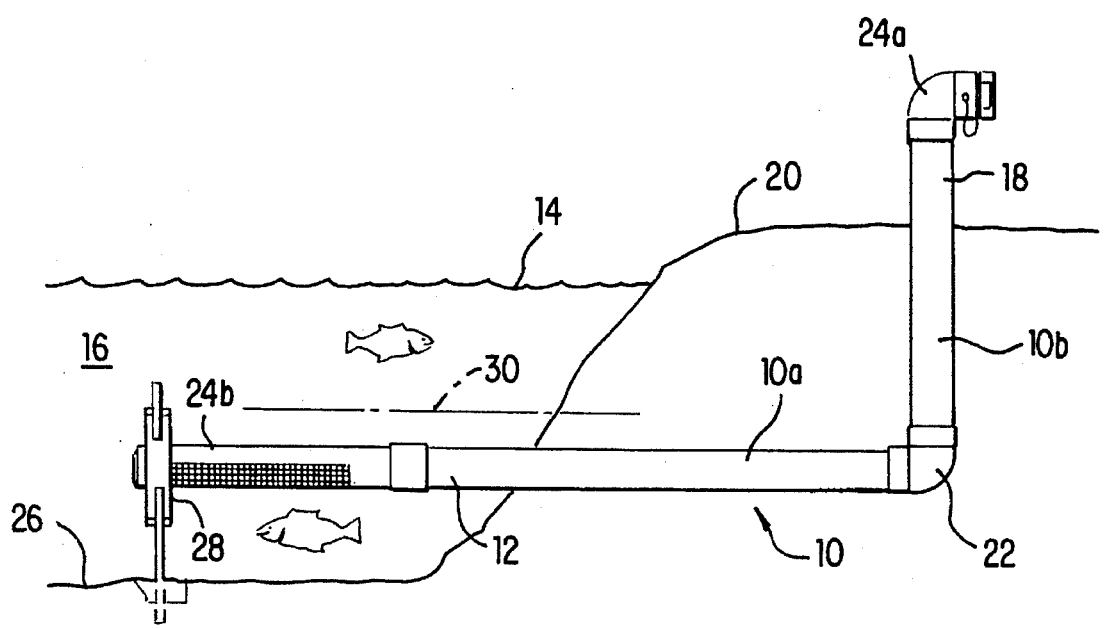
FIG. 1A is an elevational view, partially in schematic form, of a standard dry hydrant installation.
Figure 1B:
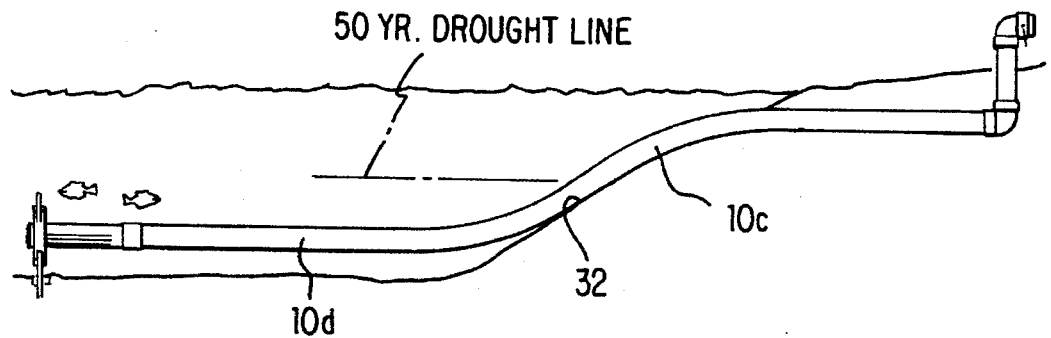
FIG. 1B is an elevational view, partially in schematic form, of a typical dry hydrant installation in a shallow pond.
Figure 1C:
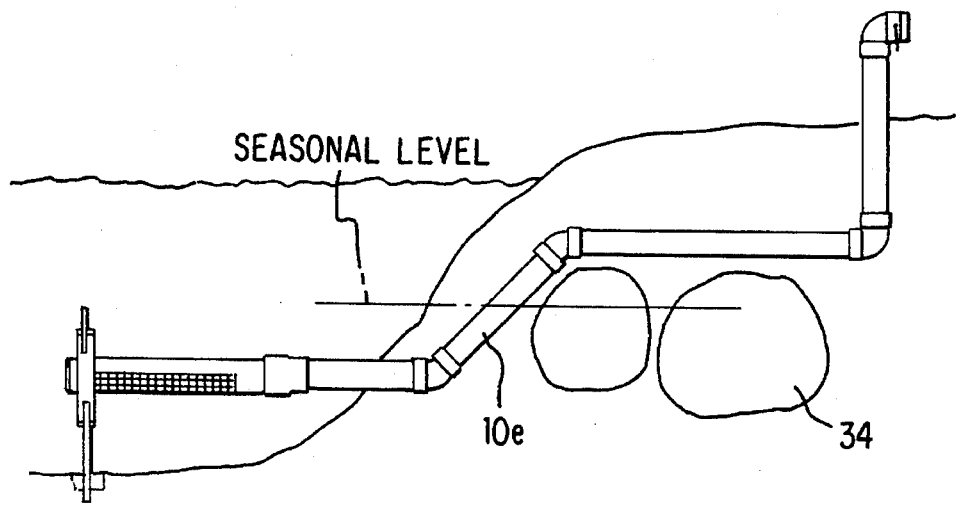
FIG. 1C is an elevational view, partially in schematic form, of a typical dry hydrant installation wherein underground obstructions are encountered.

The feature of a check valve 115 as described hereinabove advantageously either avoids the need for priming the dry hydrant pump if the pipe 100 is filled through the main pump, or minimizes the amount of work of the primer pump so as to avoid motor burnout. The addition of the check valve 115 also allows the use of installations wherein excessive dry pipe which would otherwise cause primer burnout can now be utilized, such as in a shallow pond installation (FIG. 1B) or an underground obstruction installation (FIG. 1C). A check valve 115 also allows for reliable installations in salt water or waters with marine animal presence since the strainer can now be left out of the water until needed. When required, it is then lowered and backfilled with water.

As mentioned above, the water required to fill the dry hydrant pipe 100 is delivered from a tank onboard the pumper truck 122. The amount of water carried onboard will determine the overall length of pipe sections 102–106 which can be flooded. Preferably, a 2:1 safety margin is used to assure that an adequate onboard water supply is available to fill the empty pipe. However, for certain installations and primer pump equipment, it will be understood that the pipe 100 need not necessarily be completely filled for the invention to have utility, so long as sufficient water is pumped into the pipe to prevent primer pump motor burnout.

In the preferred embodiment, the valve support plate 160 may be made from a molded ABS material. The check valve seal 174 is preferably made from neoprene rubber and the hinge bar 176 from stainless steel bar stock. The complete assembly is bolted together with stainless steel screws and then secured within the check valve housing 140 with, for example, schedule 40 PVC material.

Preferably, the check valve 115 of the present invention is designed so that head loss does not exceed 1.0 psi at a flow rate of about 1,000 gallons per minute. The weep openings 180 should allow receding of the filled pipe at a slow rate of approximately 0.33 gallons per minute but no more than one gallon per minute. The check valve 115 should also hold a head pressure of 15 feet, or 6.45 pounds per square inch.

Figure 9:
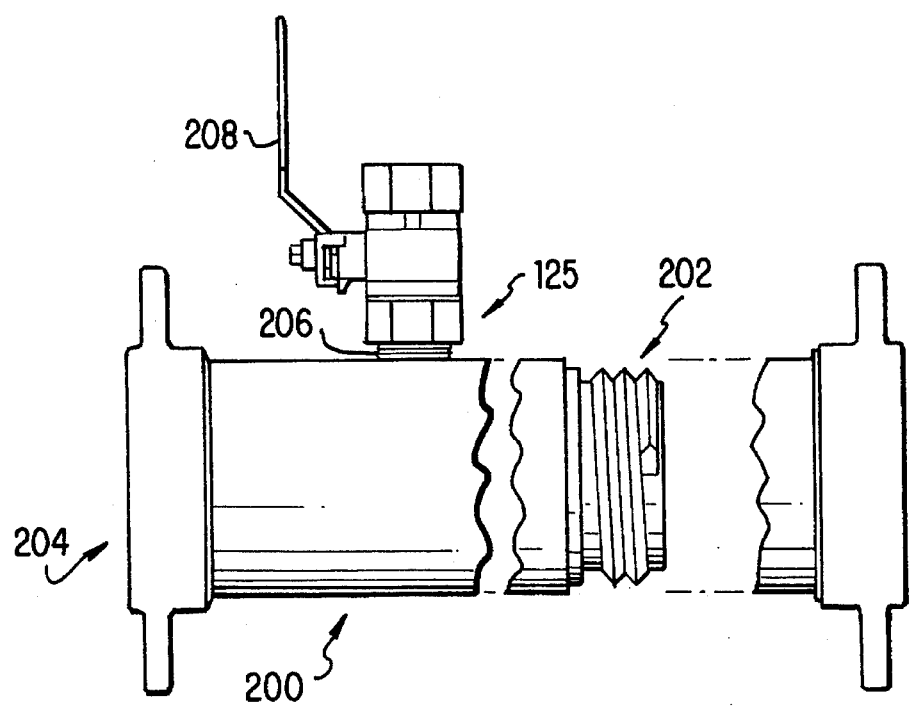
FIG. 9 is a sectional view, partly in schematic form, of a coupling adapter and a vent valve assembly in accordance with a second embodiment of the invention.

To accelerate the filling of the dry hydrant pipe in a rapid manner, the present invention provides for a vent valve assembly 125 which is positioned to vent air within the pipe to atmosphere as the air is displaced by the fill water. As best depicted in FIG. 9, the vent valve 125 is preferably attached to a coupling adapter 200 formed respectively with male and female connectors 202 and 204 at opposite ends thereof which are adapted to be connected to the pump hose 127 of the fire truck 122 and the unsubmerged end 108 of the dry hydrant pipe 110, respectively, as depicted in FIG. 2. Preferably, the vent valve 125 is threadedly connected to a fitting 206 extending upwardly from the coupling pipe 200 and in open communication therewith. The vent valve 125 may be a quarter turn ball valve as well known in the art wherein the valve lever 208 is movable between an opened and a closed position.

Initially, prior to filling, the vent valve 125 is switched to the open position to communicate the air within the dry hydrant pipe interior to atmosphere. Thereby, as the pipe 100 is filled, air inside the pipe is allowed to escape through the valve 125. The vent valve 125 is preferably located at the highest point within the hydrant pipe 100 to allow water to completely fill the pipe. After filling, the valve 125 is then closed so that the pumper 122 can now apply a negative demand pressure to the hydrant pipe to initiate water pumping.

It should be understood that the check valve 115 is capable of operation without the vent valve arrangement 125. However, since the air in the hydrant pipe 100 must be allowed to escape during the filling process, this can be otherwise accomplished by loosening the connection between the suction hose with the pump intake which would slow the filling process albeit still result in an operable system.

Inspection of dry hydrants must be performed periodically (e.g., every six months) to obtain maximum ISO credit. This inspection usually consists of flow testing and back-flushing. The purpose of the inspection is to ensure that the strainer 117 is clean and ready to use in an emergency. To enable back-flushing, the check valve and strainer assembly 115, 117 depicted in the preferred embodiment of FIG. 3 can be designed with the male and female coupling connectors 152,154 which allows for underwater removal. Once removed, the complete valve and strainer assembly 115,117 can be inspected, cleaned and replaced if necessary.

Figure 10:
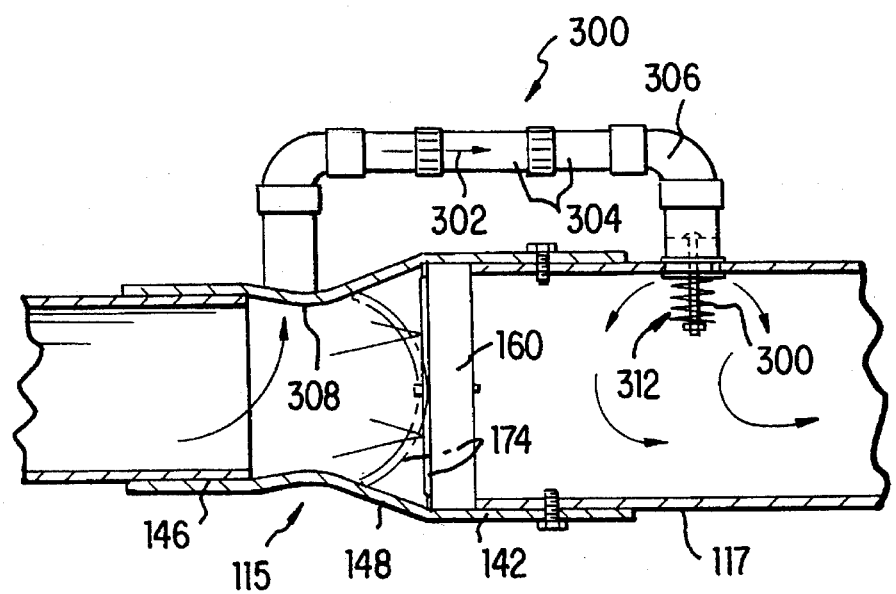
FIG. 10 is a sectional view, partly in schematic form, of a bypass valve arrangement in accordance with a third embodiment of the invention.

In accordance with another embodiment of the present invention, a back-flushing assembly 300 as depicted in FIG. 10 may be utilized to allow for periodic back-flushing of the strainer 117 without removing either the check valve 115 or the strainer assembly. The back-flushing assembly 300 comprises a bypass passageway 302 formed from a series of piping sections 304 and elbow connectors 306 having a bypass inlet 308 formed in the check valve housing side wall 146 in open communication with the closing side (facing the unsubmerged end 108) of the main check valve 120, and a bypass outlet 310 formed in the strainer side wall in open communication with the strainer interior on the opening side of the main check valve. Back-flushing of the strainer 117 is achieved by the addition of a smaller, high pressure bypass check valve 312 which may be disposed in the bypass outlet 310 and which operates in the reverse direction of the main check valve 120. Preferably, the bypass check valve 312 is operable to open under a predetermined reverse flow pressure (e.g., 25 psi) to permit back-flushing of the strainer 117 while the main check valve 120 remains closed. The normal filling pressure which is used to fill the dry hydrant pipe 100 with a reverse flow of water supplied from the pumper or tanker 122 is less than the opening pressure of the bypass valve 312 so that the bypass 302 does not inadvertently leak water into the strainer during the filling process.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. An above-ground dry hydrant, comprising:

(a) an unpressurized pipe having a submerged end located within a body of water and an unsubmerged end located elevationally above a surface of said body of water; and (b) a valve mounted to the pipe and which is operable to (1) open and permit a flow of water therethrough from said body in response to a demand negative pressure applied to the pipe at said unsubmerged end, and (2) impede a reverse flow of water therethrough in a direction extending towards said body to thereby enable said pipe to be filled with water;

wherein said valve is a check wherein said check valve assembly includes:

(i) a valve support plate formed with plural openings to permit fluid flow therethrough from said body of water; and (ii) a valve seal mounted to said valve support plate on a side thereof facing toward said unsubmerged end, said valve seal being arranged to (1) at least substantially entirely cover said plural openings under the action of said reverse flow of fluid entering said pipe from said unsubmerged end, and (2) be deflected into an open position to permit flow of water through said openings from said body;

said dry hydrant further comprising a vent valve mounted to said pipe adjacent said unsubmerged end thereof and which is opened to vent air within said pipe as the air is displaced by said reverse flow when said pipe is being filled.

2. An above-ground dry hydrant, comprising:

(a) an unpressurized hydrant pipe having a submerged end located within a body of water and an unsubmerged end located elevationally above a surface of said body of water; and (b) a valve mounted to the pipe which is operable to (1) open and permit a flow of water therethrough from said body in response to a demand negative pressure applied to the pipe at said unsubmerged end, and (2) impede a reverse flow of water therethrough in a direction extending towards said body to thereby enable said pipe to be filled with water;

wherein said valve is a check valve wherein said check valve assembly includes:

(i) a valve support plate formed with plural openings to permit fluid flow therethrough from said body of water; and (ii) a valve seal mounted to said valve support plate on a side thereof facing toward said submerged end, said valve seal being arranged to (1) at least substantially entirely cover said plural openings under the action of said reverse flow of fluid entering said pipe from said unsubmerged end, and (2) be deflected into and open position to permit flow of water through said openings from said body;

said dry hydrant further comprising a vent valve mounted to said pipe adjacent said unsubmerged end thereof and which is opened to vent air within said pipe as the air is displaced by said reverse flow when said pipe is being filled, wherein said vent valve is connected to coupling adapter having one end attached to said submerged end of said pipe and an opposite end to which a hose is attached to selectively pump said reverse flow of water into said pipe or to apply said demand pressure thereto.

3. The dry hydrant of claim 2, wherein said vent valve defines the highest elevational point within a portion of a water circuit defined between said check valve and the point at which said demand pressure is applied to said pipe.

4. An above-ground dry hydrant, comprising:

(a) an unpressurized hydrant pipe having a submerged end located within a body of water and an unsubmerged end located elevationally above a surface of said body of water; and (b) a valve mounted to the pipe and which is operable to (1) open and permit a flow of water therethrough from said body in response to a demand negative pressure applied to the pipe at said unsubmerged end, and (2) impede a reverse flow of water therethrough in a direction extending towards said body to thereby enable said pipe to be filled with water;

said dry hydrant further comprising a vent valve mounted to said pipe adjacent said unsubmerged end thereof and which is opened to vent air within said pipe as the air is displaced by said reverse flow when said pipe is being filled.

5. An above-ground dry hydrant, comprising:

(a) an unpressurized hydrant pipe having a submerged end located within a body of water and an unsubmerged end located elevationally above a surface of said body of water; and (b) a valve mounted to the pipe and which is operable to (1) open and permit a flow of water therethrough from said body in response to a demand negative pressure applied to the pipe at said unsubmerged end, and (2) impede a reverse flow of water therethrough in a direction extending towards said body to thereby enable said pipe to be filled with water;

wherein said valve is a check valve;

said dry hydrant further comprising an underwater strainer installed at said submerged end, wherein said check valve is located within said submerged end adjacent said strainer, said dry hydrant further comprising a bypass valve arrangement including a bypass passage having opposite ends respectively connected to said pipe on opposite sides of said check valve which is main check valve, one said end of said bypass passage being in communication with said strainer, and a bypass check valve mounted within said bypass passage and which is operable to open, under a predetermined reverse flow pressure, to permit back-flushing of said strainer while said main check valve remains closed.

6. The dry hydrant of claim 5, wherein said predetermined reverse flow pressure is about 25 psi.

7. The dry hydrant of claim 5, further comprising a vent valve mounted to said pipe adjacent said unsubmerged end thereof and which is opened to vent air within said pipe as the air is displaced by said reverse flow when said pipe is being filled.

8. A method of using an above-ground dry hydrant having an unpressurized hydrant pipe having a submerged end located within a body of water having a surface level and an unsubmerged end located elevationally above said body of water, comprising the step of:

(a) filling said pipe with fluid to displace air therewithin;

(b) preventing said fluid from entering said body through said submerged end by placement of a check valve within said hydrant pipe;

(c) applying a demand pressure to the pipe proximate said unsubmerged end thereof to begin drawing water through said pipe from said body;

(d) removing said demand pressure when drawing of the water is completely finished; and (e) draining the fluid in said pipe to approximately the same elevation as said surface level of said body of water.

9. The method of claim 8, wherein said filling of said pipe occurs with a fluid source which is external from said body of water.

10. The method of claim 8, wherein substantially the entire length of said pipe is filled with fluid between said submerged and unsubmerged ends.

11. The method of claim 8, wherein said pipe is filled with water carried onboard a pumper truck.

12. The method of claim 8, comprising the further step of venting air within said pipe during the fluid filling step.

13. The method of claim 8, comprising the further step of periodically back-flushing a strainer connected to said submerged end.

14. The method of claim 8, wherein said draining of said pipe occurs by controlled leakage through a plurality of weep openings within said pipe.

15. A method of using an above-ground dry hydrant having an unpressurized hydrant pipe having a submerged end located within a body of water and an unsubmerged end located elevationally above said body of water, comprising the steps of:

(a) filling said pipe with fluid to displace air therewithin; and (b) applying a demand pressure to the pipe proximate said unsubmerged end thereof to begin drawing water through said pipe from said body; and comprising the further step of periodically back-flushing a strainer connected to said submerged end, wherein a check valve is disposed in said submerged end upstream and adjacent said strainer to prevent filling fluid from entering said body of water during filling, and wherein said back-flushing occurs by directing the reverse flow of fluid around said check valve through a bypass passage and opening a bypass check valve in said bypass passage with a sufficient reverse flow back-flushing pressure which is greater than a predetermined pressure.

* * * * *